(12) United States Patent
Zhang et al.

(10) Patent No.: US 11,307,684 B2
(45) Date of Patent: Apr. 19, 2022

(54) TOUCH ARRAY SUBSTRATE, DISPLAY PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ruichen Zhang, Beijing (CN); Kaixuan Wang, Beijing (CN); Xiaoqing Peng, Beijing (CN); Dong Liang, Beijing (CN); Feifei Wang, Beijing (CN); Wenjun Xiao, Beijing (CN); Xingyou Luo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 508 days.

(21) Appl. No.: 16/333,005

(22) PCT Filed: Sep. 5, 2018

(86) PCT No.: PCT/CN2018/104195
§ 371 (c)(1),
(2) Date: Mar. 13, 2019

(87) PCT Pub. No.: WO2019/072053
PCT Pub. Date: Apr. 18, 2019

(65) Prior Publication Data
US 2021/0333908 A1    Oct. 28, 2021

(30) Foreign Application Priority Data
Oct. 11, 2017   (CN) .................. 201710942566.X

(51) Int. Cl.
  *G02F 1/1333*    (2006.01)
  *G06F 3/041*    (2006.01)
  (Continued)

(52) U.S. Cl.
  CPC ........ *G06F 3/0412* (2013.01); *G02F 1/13338* (2013.01); *G02F 1/134345* (2021.01); *G06F 3/0448* (2019.05)

(58) Field of Classification Search
  None
  See application file for complete search history.

(56) References Cited

U.S. PATENT DOCUMENTS 9,218,078 B2   12/2015   Jiang et al.
9,329,737 B2    5/2016   Lee et al.
(Continued)

FOREIGN PATENT DOCUMENTS

CN    102654806 A    9/2012
CN    103713789 A    4/2014
(Continued)

OTHER PUBLICATIONS

International Search Report and Written Opinion dated Nov. 28, 2018.

*Primary Examiner* — James A Dudek
(74) *Attorney, Agent, or Firm* — Dilworth & Barrese, LLP.; Michael J. Musella, Esq.

(57) ABSTRACT

A touch array substrate, a display panel and a display device are provided. The touch array substrate includes a plurality of first electrodes disposed in a row direction and a column direction to form a plurality of electrode rows and a plurality of electrode columns. An edge of the plurality of first electrodes in the column direction includes a convex shape and a concave shape, the convex shape of an edge of one of two adjacent ones of the plurality of electrode columns
(Continued)

extends into the concave shape of an edge of the other of the two adjacent ones of the plurality of electrode columns. The touch array substrate can avoid deficiencies such as a vertical line and the like in a macroscopic manner.

17 Claims, 4 Drawing Sheets

(51) Int. Cl.
*G06F 3/044* (2006.01)
*G02F 1/1343* (2006.01)

(56) References Cited

U.S. PATENT DOCUMENTS

| | | | |
|---|---|---|---|
| 9,778,802 B2 | 10/2017 | Yang et al. | |
| 10,318,045 B2 | 6/2019 | Ding et al. | |
| 2014/0218630 A1 | 8/2014 | Kang | |
| 2017/0255321 A1* | 9/2017 | Ding | G06F 3/0412 |
| 2018/0275809 A1 | 9/2018 | He et al. | |

FOREIGN PATENT DOCUMENTS

| | | |
|---|---|---|
| CN | 103793094 A | 5/2014 |
| CN | 104020906 A | 9/2014 |
| CN | 105182582 A | 12/2015 |
| CN | 105739804 A | 7/2016 |
| JP | 2017111567 A | 6/2017 |

* cited by examiner

TOUCH ARRAY SUBSTRATE, DISPLAY PANEL AND DISPLAY DEVICE

The present application claims priority to Chinese patent application No. 201710942566.X, filed on Oct. 11, 2017, the entire disclosure of which is incorporated herein by reference as part of the present application.

TECHNICAL FIELD

At least one embodiment of the present disclosure relates to a touch array substrate, a display panel and a display device.

BACKGROUND

With the continuous development of display technology and touch technology, the touch technology has been used throughout people's daily lives. Generally, touch technologies include different technical directions such as optical touch technology, resistive touch technology, capacitive touch technology, and electromagnetic touch technology; in many touch technologies, the capacitive touch technology has become the mainstream of touch technology with its low cost and excellent user experience.

On the other hand, touch display panels can be divided into an on-cell touch display panel, a one glass solution (OGS) touch display panel, and an in-cell touch display panel. The on-cell touch display panel is a single touch panel integrating a touch structure and a protective substrate outside the display panel, a liquid crystal display screen having a touch function is formed by separately forming a touch panel and a liquid crystal panel, and then bonding them together. The one glass solution touch display panel and the in-cell touch display panel are both formed by integrating a touch structure and a liquid crystal panel, a difference between the two is that: in the one glass solution touch display panel, the touch structure is formed on a surface of the opposing substrate (for example, a color filter substrate) away from an array substrate of the liquid crystal panel; in the in-cell touch display touch panel, the touch structure is disposed in the inside of the liquid crystal panel, for example, the touch structure is disposed on a side of the opposing substrate facing the array substrate of the liquid crystal panel, and/or the touch structure is disposed on the array substrate.

SUMMARY

At least one embodiment of the present disclosure provides a touch array substrate, which includes a plurality of first electrodes disposed in a row direction and a column direction to form a plurality of electrode rows and a plurality of electrode columns. An edge of the plurality of first electrodes in the column direction includes a convex shape and a concave shape, the convex shape of an edge of one of two adjacent ones of the plurality of electrode columns extends into the concave shape of an edge of the other of the two adjacent ones of the plurality of electrode columns.

For example, the touch array substrate provided by an embodiment of the present disclosure further includes: a plurality of sub pixels disposed in the row direction and the column direction to form a plurality of pixel rows and a plurality of pixel columns. The plurality of sub pixels include a plurality of gap sub pixels, each of the plurality of gap sub pixels is partially overlapped with each of two adjacent ones of the plurality of electrode columns, and the gap sub pixels corresponding to the two adjacent ones of the plurality of electrode columns are located in different pixel columns.

For example, in the touch array substrate provided by an embodiment of the present disclosure, each of the plurality of first electrodes is overlapped with multiple gap sub pixels.

For example, in the touch array substrate provided by an embodiment of the present disclosure, two edges opposite to each other and respectively located at two adjacent ones of the plurality of first electrodes in the row direction are overlapped with gap sub pixels belonging to a same pixel column.

For example, in the touch array substrate provided by an embodiment of the present disclosure, each of the plurality of first electrodes has a shape of a rectangle, the first electrodes in each of the plurality of electrode columns are dislocated in the row direction to form a convex portion and a concave portion.

For example, in the touch array substrate provided by an embodiment of the present disclosure, in two edges opposite to each other and respectively located at two adjacent ones of the plurality of first electrodes in the row direction, each of the two edges includes: at least one concave portion concaved in the row direction; and at least one convex portion protruded in the row direction. The concave portion and the convex portion are alternately disposed, the concave portion and the convex portion of each of the two edges are respectively overlapped with the gap sub pixels belonging to different sub pixel columns.

For example, in the touch array substrate provided by an embodiment of the present disclosure, each of the at least convex portion includes a shape of a rectangle.

For example, the touch array substrate provided by an embodiment of the present disclosure further includes: a plurality of wires, extending in the column direction and electrically connected with the plurality of first electrodes. Each of the plurality of wires passes through effective display regions of the sub pixels disposed in the column direction, a wire passing through the effective display regions of the gap sub pixels disposed in the column direction includes a plurality of first portions and a plurality of second portions, the plurality of first portions are located between two adjacent ones of the plurality of first electrodes in the row direction, and the plurality of second portions are partially overlapped with at least one of the plurality of first electrodes.

For example, in the touch array substrate provided by an embodiment of the present disclosure, the plurality of first portions and the plurality of second portions are alternately disposed.

For example, in the touch array substrate provided by an embodiment of the present disclosure, a length of each of the plurality of first portions is equal to a length of each of the plurality of first electrodes in the column direction.

For example, in the touch array substrate provided by an embodiment of the present disclosure, each of the plurality of first electrodes is used as a common electrode and a touch electrode.

For example, in the touch array substrate provided by an embodiment of the present disclosure, each of the plurality of wires is used as a common electrode line and a touch electrode line.

For example, in the touch array substrate provided by an embodiment of the present disclosure, each of the plurality of sub pixels includes: a second electrode, configured to form an electric field with the plurality of first electrodes.

For example, in the touch array substrate provided by an embodiment of the present disclosure, the plurality of wires and the plurality of first electrodes are respectively electrically connected through via holes.

For example, in the touch array substrate provided by an embodiment of the present disclosure, each of the plurality of first electrodes corresponds to an integer number of sub pixels in the column direction.

At least one embodiment of the present disclosure further provides a display panel, including the touch array substrate according to any embodiment as mentioned above.

For example, the display panel provided by an embodiment of the present disclosure further includes: an opposing substrate, cell-assembled with the touch array substrate; and a liquid crystal layer, disposed between the array substrate and the opposing substrate.

At least one embodiment of the present disclosure further provides a display device, including the display panel according to any embodiment as mentioned above.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
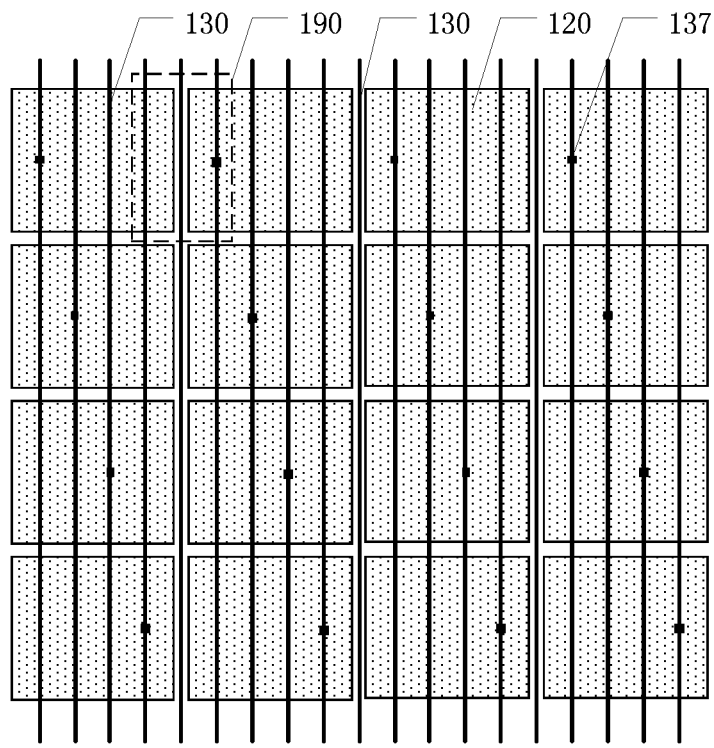
FIG. 1 is a planar view of an array substrate.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. Terms "connect," "connecting," and the like are not limited to physical or mechanical connections, but may include electrical connections, whether direct or indirect.

Currently, the dominant position of the touch technology has been rapidly occupied by the in-cell touch display panel because of its advantages of compatibility with the display panel process, simple manufacturing process, and low cost. However, in a typical in-cell touch display panel, because touch electrode lines are arranged in parallel with data lines or other wires, a black matrix needs to be wider to cover the touch electrode lines and the data lines or other wires, thereby causing an aperture ratio of the touch display panel to decrease. In order to solve the above problem, the touch electrode lines can be disposed in an aperture region of sub pixels, in this case, the black matrix can be designed to be narrower, and thereby improving the aperture ratio of the touch display panel.

However, in a study, an inventor of the application has found that: a common electrode needs to be divided at a position where a touch electrode line is located to form common electrode blocks that can also be used as touch electrodes, so as to prevent the common electrode blocks also used as the touch electrodes from overlapping with the touch electrode line. In this case, all sub pixels in a sub pixel column passed through by the touch electrode line will simultaneously overlap with two common electrode blocks; for the abovementioned sub pixel, due to reasons such as signal delay of different common electrode blocks, common voltages on the two common electrode blocks overlapping the sub pixel at the same time may cause a difference (delay or voltage difference) in a case of displaying, thereby causing a difference in display (e.g., grayscale or brightness) of two portions of the sub pixel overlapping the two common electrode blocks. Therefore, the sub pixel column passed through by the touch electrode line may have deficiencies such as a vertical line or the like in a macroscopic manner.

Figure 2:
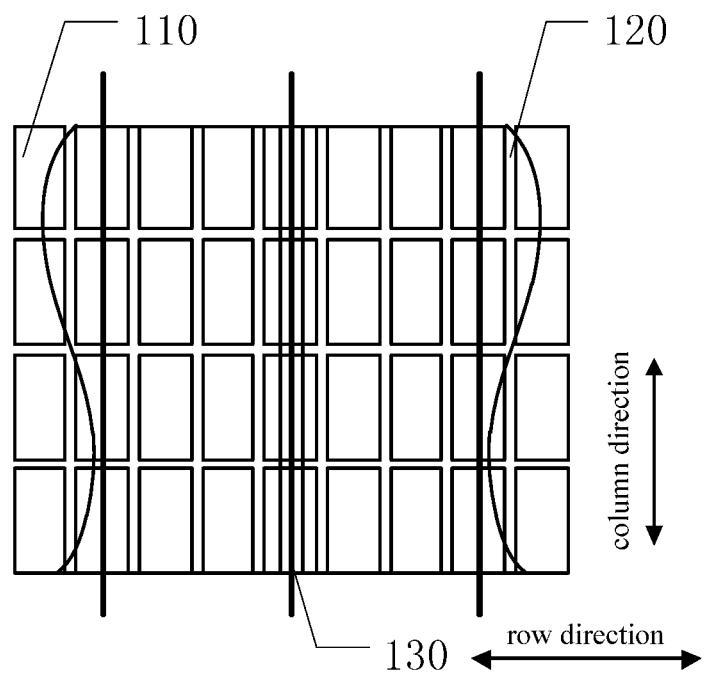
FIG. 2 is an enlarged view of a broken line frame 190 of FIG. 1.

FIG. 1 illustrates a planar view of an array substrate. FIG. 2 is an enlarged view of a broken line frame 190 of FIG. 1. As illustrated in FIG. 1 and FIG. 2, the display panel includes a plurality of sub pixels 110 (as illustrated in FIG. 2) arranged in an array, a plurality of first electrodes 120 arranged in an array and wires 130 respectively connected with the plurality of first electrodes 120. For example, the wires 130 can be respectively electrically connected with the first electrodes 120 through via holes 137. The first electrode 120 can be used as a common electrode and a touch electrode, that is, the first electrode 120 can form an electric field with a pixel electrode for display, or can also be used as a touch electrode to achieve a touch function. As illustrated in FIG. 1 and FIG. 2, in order to improve an aperture ratio of the array substrate, the wire 130 can be disposed in an aperture region of the sub pixel 110 (that is, the wire 130 passes through effective display regions of the sub pixels). In order to prevent the first electrode 120 from overlapping with the wire 130, adjacent two first electrodes 120 in a row direction are separated by the wire 130. In this case, as illustrated in FIG. 2, all sub pixels 110 in the sub pixel column passed through by the wire 130 separating adjacent two first electrodes 120 in the row direction will simultaneously overlap with two first electrodes 120, due to reasons such as signal delay of two first electrodes 120, common voltages on the two electrodes 120 may cause a difference, thereby causing a difference in display (e.g., grayscale or brightness) of two portions overlapping the two common electrode blocks. Therefore, the sub pixel column passed through by the wire may have deficiencies such as a vertical line or the like in a macroscopic manner.

Therefore, at least one embodiment of the present disclosure provides a touch array substrate, a display panel and a display device. The touch array substrate includes: a plurality of first electrodes, disposed in a row direction and a column direction to form a plurality of electrode rows and a plurality of electrode columns. An edge of the plurality of first electrodes in the column direction includes a convex shape and a concave shape, the convex shape of an edge of one of two adjacent ones of the plurality of electrode columns extends into the concave shape of an edge of the other of the two adjacent ones of the plurality of electrode columns. The touch array substrate can avoid deficiencies such as a vertical line and the like in a macroscopic manner.

The touch array substrate, the display panel and the display device provided by an embodiment of the present disclosure are described below with reference to the accompanying drawings.

Figure 3:
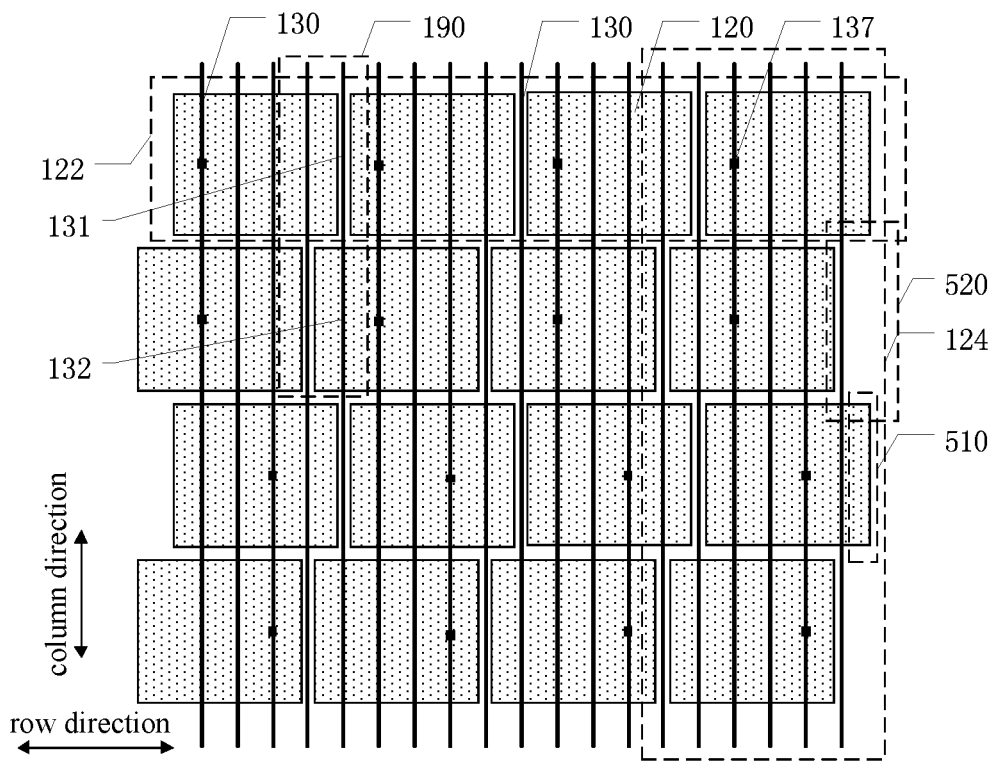
FIG. 3 is a planar view of a touch array substrate provided by an embodiment of the present disclosure.
Figure 4:
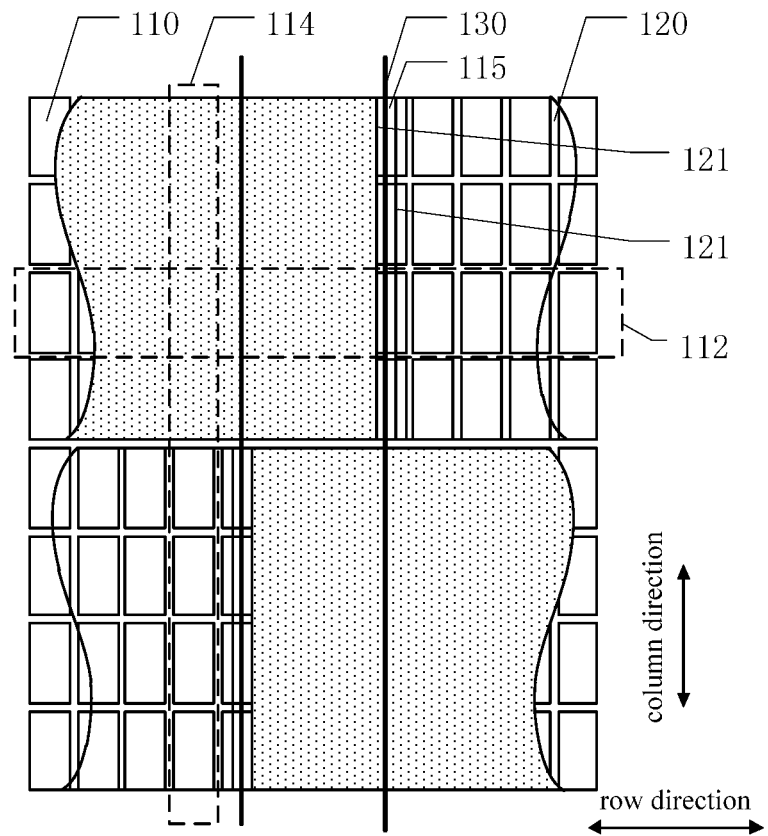
FIG. 4 is an enlarged view of a broken line frame 190 of FIG. 3.

At least one embodiment of the present disclosure provides an array substrate. FIG. 3 is a planar view of an array substrate provided by an embodiment of the present disclosure; FIG. 4 is an enlarged view of a region where a broken line frame 190 in FIG. 3 is located. As illustrated in FIG. 3 and FIG. 4, the touch array substrate includes: a plurality of first electrodes 120, disposed in a row direction and a column direction to form a plurality of electrode rows 122 and a plurality of electrode columns 124. An edge of the plurality of first electrodes 120 in the column direction includes a convex shape 510 and a concave shape 520, the convex shape 510 of an edge of one of two adjacent ones of the electrode columns 124 extends into the concave shape 520 of an edge of the other of the two adjacent ones of the electrode columns 124. Therefore, adjacent two electrode columns can correspond to different columns of sub pixels, so that the touch array substrate can avoid deficiencies such as a vertical line and the like in a macroscopic manner.

For example, as illustrated in FIG. 3 and FIG. 4, the touch array substrate further includes a plurality of sub pixels 110. The sub pixel here is the smallest unit for display, which may include a pixel electrode, etc. In the present specification, for the convenience of description, the first electrode is not included in the sub pixel, but a case where the first electrode is required to be used for display is not excluded. For example, the first electrode 120 can be used as a common electrode, an electric field formed between the common electrode and a pixel electrode can be used to drive liquid crystal to display. The plurality of sub pixels 110 are disposed in the row direction and the column direction to form a plurality of pixel rows 112 and a plurality of pixel columns 114; the plurality of first electrodes 120 are also disposed in the row direction and the column direction to form the electrode rows 122 and the electrode columns 124; the plurality of sub pixels 110 include a plurality of gap sub pixels 115, each gap sub pixel 115 is partially overlapped with each of two adjacent ones of the electrode columns 124, and gap sub pixels 115 corresponding to the two adjacent ones of the electrode columns 124 are located in different pixel columns 114. It should be noted that, the abovementioned "gap sub pixels corresponding to the two adjacent ones of the electrode columns" means gap sub pixels overlapping with each of the adjacent two electrode columns.

In the touch array substrate provided by the present embodiment, because the gap sub pixel 115 is partially overlapped with each electrode column 124 in adjacent two electrode columns 124 simultaneously, for each gap sub pixel 115, the gap sub pixel 115 will partially overlap with two first electrodes 120 adjacent in the row direction at the same time. For example, as illustrated in FIG. 4, a left half portion of the gap sub pixel 115 is partially overlapped with one first electrode 120, a right half portion of the gap sub pixel 115 is partially overlapped with the other first electrode 120, in this case, because of a difference in common voltages on the two first electrodes 120, the left half portion and the right half portion of the gap sub pixel 115 will generate a display difference, for example, a grayscale difference or a brightness difference. However, because the gap sub pixels 115 corresponding to adjacent two electrode columns 124 are located in different pixel columns 114, the gap sub pixels 115 generating display differences cannot be located in the same pixel column 114, so as to avoid deficiencies such as a vertical line and the like in a macroscopic manner. Furthermore, the touch array substrate can solve the abovementioned problems without adding additional process steps and additional cost. It should be noted that, the abovementioned "vertical line" includes a dark line or a bright line.

For example, the first electrode can be a transparent electrode, for example, the first electrode can be made of a transparent oxide material, for example, made of Indium Tin Oxide (ITO).

For example, in some examples, as illustrated in FIG. 3 and FIG. 4, each first electrode 120 is overlapped with multiple gap sub pixels 115. That is, adjacent two first electrodes 120 in the row direction correspond to the plurality of gap sub pixels 115.

For example, in some examples, as illustrated in FIG. 3 and FIG. 4, each first electrode 120 is overlapped with multiple sub pixels 110 in the row direction.

For example, in some examples, as illustrated in FIG. 3 and FIG. 4, two edges 121 opposite to each other and respectively located at two adjacent ones of the first electrodes 120 in the row direction are overlapped with gap sub pixels 115 belonging to the same pixel column 114. That is, the gap sub pixels 115 corresponding to the adjacent two first electrodes 120 in the row direction are located in the same pixel column 114. The gap sub pixels 115 corresponding to two edges 121 of two adjacent ones of the first electrodes 120 in the column direction are located in different pixel columns 114, so as to achieve that the gap sub pixels 115 corresponding to the adjacent two electrode columns 124 are located in different pixel columns 114. Thus, the first electrode structure in the touch array substrate provided by the present example is simple.

For example, in some examples, as illustrated in FIG. 3 and FIG. 4, each of the first electrodes 120 has a shape of a rectangle. In this case, the first electrodes 120 in each electrode column 124 are dislocated in the row direction to form the convex shape 510 and the concave shape 520. Certainly, the present disclosure includes but is not limited thereto, the shape of the first electrode can also be other shapes.

For example, in some examples, as illustrated in FIG. 3 and FIG. 4, the touch array substrate further includes a plurality of wires 130 extending in the column direction and electrically connected with the plurality of first electrodes 120 respectively, so as to load or output an electrical signal for each first electrode 120. Each of the wires 130 passes through effective display regions of the sub pixels 110 disposed in the column direction, that is, each wire is disposed in an aperture region of the sub pixels 110; thus, a black matrix can be designed to be narrow, so as to improve an aperture ratio of the touch array substrate. As illustrated in FIG. 3 and FIG. 4, a wire 130 passing through effective display regions of the gap sub pixels 115 disposed in the column direction includes a plurality of first portions 131 and a plurality of second portions 132, the first portions 131 are located between two adjacent ones of the first electrodes 120 in the row direction, and the second portions 132 are partially overlapped with at least one of the first electrodes 120. Thus, a sub pixel passed through by the first portion 131 is a gap sub pixel, a sub pixel passed through by the second portion 132 is a normal sub pixel, so that the gap sub pixels can be prevented from being connected into one column, thereby avoiding the occurrence of deficiencies such as a vertical line or the like in a macroscopic manner. It should be noted that, the abovementioned "effective display region" refers to a region in which a sub pixel can emit light or transmit light for display, the abovementioned "wire passing through effective display regions" refers that the wire is overlapped with the effective display regions of the sub pixels.

For example, in some examples, as illustrated in FIG. 3 and FIG. 4, a length of the first portion 131 is equal to a length of the first electrode 120 in the column direction. Thus, the first portion 131 can play a role of separating adjacent two first electrodes 120, avoid overlapping with the first electrode 120, and can reduce or even eliminate the capacitance formed by the first portion 131 and the first electrode 120.

For example, in some examples, as illustrated in FIG. 3 and FIG. 4, the wires 130 and the first electrodes 120 are respectively electrically connected through via holes 137.

For example, in some examples, as illustrated in FIG. 4, each of the first electrodes 120 corresponds to an integer number of sub pixels 110 in the column direction, so as to prevent the sub pixel from partially overlapping with the adjacent two first electrodes 120 in the column direction simultaneously, thereby avoiding a bright line or a dark line in the row direction.

Figure 5:
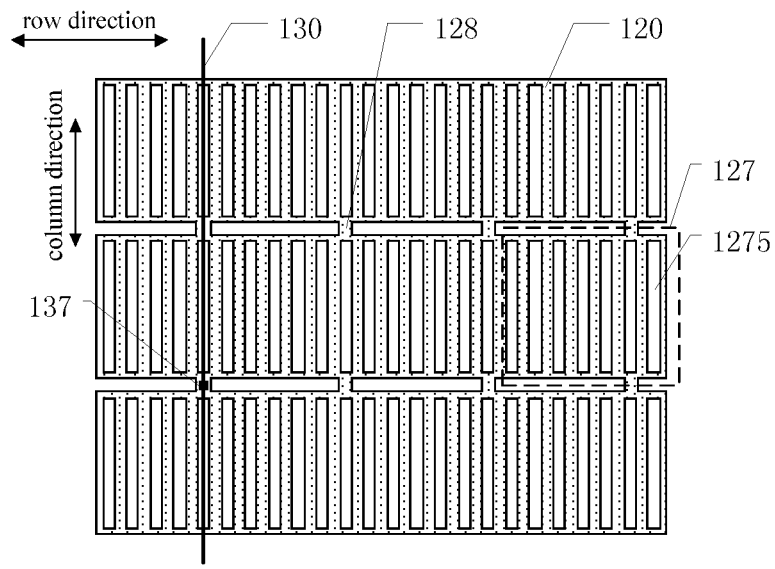
FIG. 5 is a planar view of a first electrode provided by an embodiment of the present disclosure.

FIG. 5 is view of a first electrode provided by an embodiment of the present disclosure. As illustrated in FIG. 5, the first electrode 120 can include a plurality of first sub electrodes 127, each first sub electrode 127 includes a plurality of openings 1275. Each wire 130 passing through the effective display regions of the sub pixels 110 disposed in the column direction can reduce or even eliminate the capacitance with the first electrode 120 by being disposed at a position where the plurality of openings 1275 are located, thereby reducing delay in loading or outputting a signal of the wire 130.

It should be noted that, the second portion 132 can also be disposed in the plurality of openings 1275 of the first electrode 120.

For example, in some examples, as illustrated in FIG. 5, the first electrode 120 further includes a connection portion 128; the connection portion 128 is used to electrically connect adjacent two first sub electrodes 127, so that the first electrodes 120 as a whole can be used as a touch electrode.

For example, in some examples, as illustrated in FIG. 5, the connection portion 128 is located in a region between the first sub electrodes 127.

For example, in some examples, the plurality of first sub electrodes are disposed in one-to-one correspondence with the plurality of sub pixels, for example, the plurality of first sub electrodes are disposed in one-to-one correspondence with pixel electrodes of the plurality of sub pixels, in this case, as illustrated in FIG. 5, the via hole 137 can be located in a region between respective first sub electrodes 127, for example, a region in which the connection portion 128 is located; that is, the via hole can be located in a region between respective first sub pixels, i.e., a region in which the black matrix is located. Thus, an electrical connection between the wire and the first electrode can be achieved through the via hole, and the wire can be located at a position where the plurality of openings are located, so that the capacitance between the wire and the first electrode can be reduced or even eliminated, thereby reducing the delay in loading or outputting a signal of the wire.

For example, in some examples, the first electrode is used as a common electrode and a touch electrode. For example, as illustrated in FIG. 5, upon the first electrode 120 being used as a common electrode, the first electrode 120 is integrally applied a common electrode signal. In this case, the first sub electrodes 127 each having the plurality of openings 1275 can respectively form an electric field with the pixel electrodes for display. Upon the first electrode 120 being used as a touch electrode, because the plurality of first sub electrodes 127 are electrically connected with each other, the first electrodes 120 as a whole can be used as a touch electrode.

Figure 6:
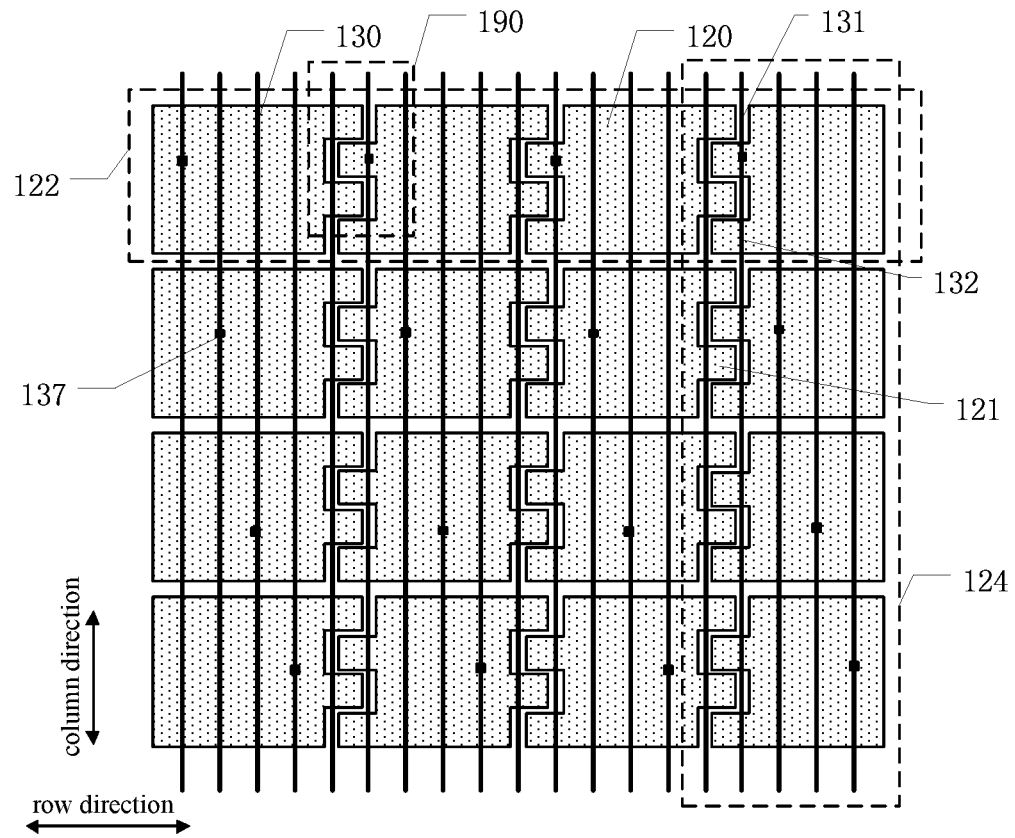
FIG. 6 is a planar view of another touch array substrate provided by an embodiment of the present disclosure.
Figure 7:
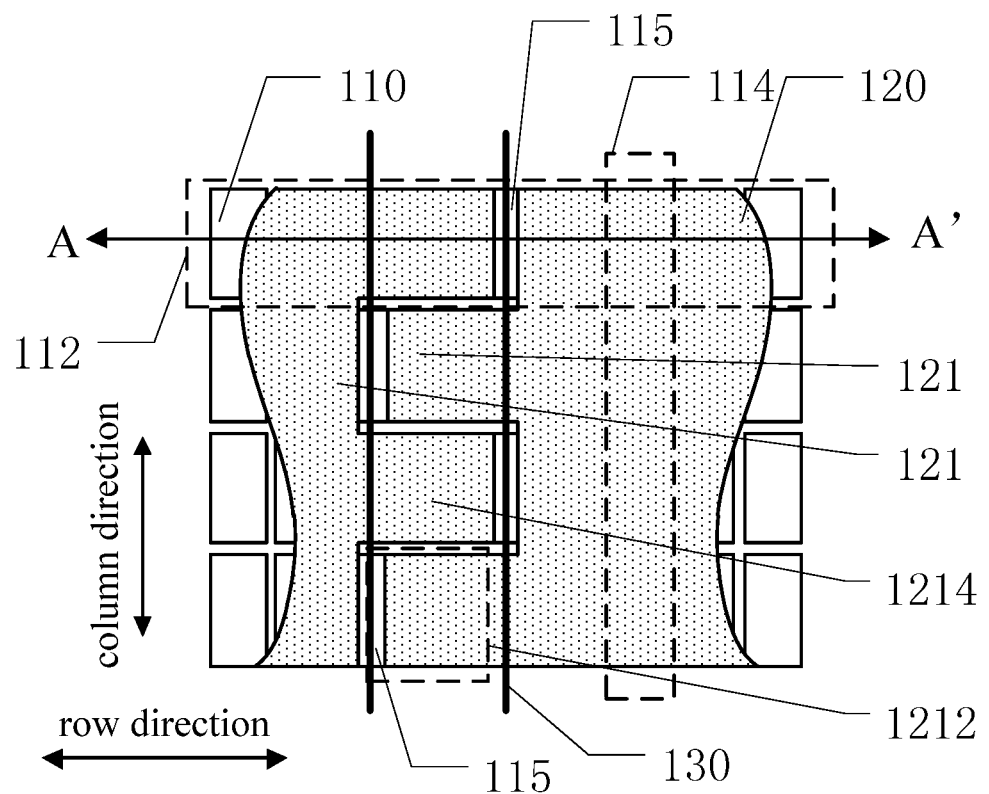
FIG. 7 is an enlarged view of a broken line frame 190 of FIG. 6.

FIG. 6 is a planar view of another touch array substrate provided by an embodiment of the present disclosure. FIG. 7 is an enlarged view of a region where a broken line frame 190 of FIG. 7 is located. As illustrated in FIG. 6 and FIG. 7, in two opposite edges 121 of two adjacent ones of the first electrodes 120 in the row direction, each edge 121 includes: at least one concave portion 1212 concaved in the row direction and at least one convex portion 1214 protruded in the row direction. The concave portion 1212 and the convex portion 1214 are alternately disposed, the concave portion 1212 and the convex portion 1214 of each edge 121 are respectively overlapped with the gap sub pixels 115 belonging to different sub pixel columns 114. That is, the gap sub pixels 115 corresponding to adjacent two first electrodes 120 in the row direction are located in different pixel columns 114, so that the gap sub pixels 115 corresponding to adjacent two electrode columns 124 are located in different pixel columns 114. Upon the first electrode having a larger size, the touch array substrate provided by the present example can prevent the gap sub pixel corresponding to adjacent two first electrodes in the row direction from generating deficiencies such as a short vertical line or the like in a macroscopic manner. It should be noted that, in the touch array substrate illustrated in FIG. 6, the convex portions 1214 can constitute the abovementioned convex shape 510, and the concave portions 1212 can constitute the abovementioned concave shape 520.

For example, in some examples, as illustrated in FIG. 6 and FIG. 7, the convex portion 1214 includes a shape of a rectangle. Certainly, the present disclosure includes but is not limited thereto, the shape of the first electrode can also be other shapes.

For example, in some examples, as illustrated in FIG. 6 and FIG. 7, the touch array substrate further includes a plurality of wires 130 extending in the column direction and electrically connected with the plurality of first electrodes 120 respectively, so as to load or output an electrical signal for each first electrode 120. Each of the wires 130 passes through effective display regions of the sub pixels 110 disposed in the column direction, that is, each wire is disposed in an aperture region of the sub pixels 110; a wire 130 passing through effective display regions of the gap sub pixels 115 disposed in the column direction includes a plurality of first portions 131 and a plurality of second portions 132, the first portions 131 are located between two adjacent ones of the first electrodes 120 in the row direction, and the second portions 132 are partially overlapped with at least one of the first electrodes 120.

For example, in some examples, as illustrated in FIG. 6 and FIG. 7, the plurality of first portions 131 and the plurality of second portions 132 are alternately disposed.

Figure 8:
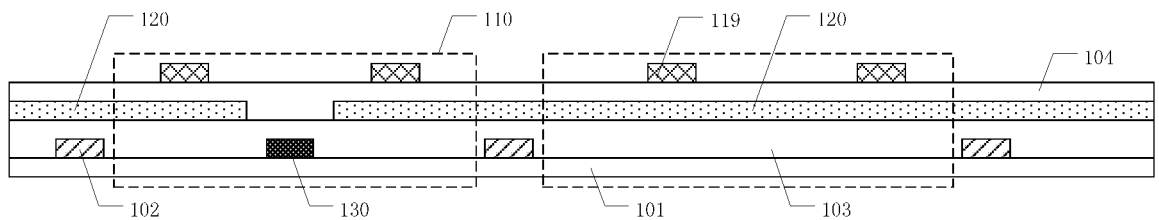
FIG. 8 is a cross sectional view of a touch array substrate in an A-A' direction of FIG. 7 provided by an embodiment of the present disclosure.

FIG. 8 is a cross sectional view of a touch array substrate in an A-A' direction of FIG. 7 provided by an embodiment of the present disclosure. As illustrated in FIG. 8, in the touch array substrate, each sub pixel 110 includes: a second electrode 119, configured to form an electric field with the first electrode 120. Thus, the touch array substrate can be used for a liquid crystal display panel, an electric field generated by the first electrode and the second electrode is used to drive liquid crystal molecules to deflect, thereby realizing display.

For example, in some examples, as illustrated in FIG. 8, the touch array substrate further includes a base substrate 101. The base substrate 101 can be a transparent substrate such as a quartz substrate, a glass substrate or a plastic substrate.

For example, in some examples, as illustrated in FIG. 8, the touch array substrate further includes a data line 102, disposed on the base substrate 101. The data line 102 can be disposed side by side with the wire 130.

For example, in some examples, as illustrated in FIG. 8, the touch array substrate further includes a first insulating layer 103, disposed on a side of the data line 102 and the wire 130 away from the base substrate 101.

For example, in some examples, as illustrated in FIG. 8, the first electrode 120 is disposed on a side of the first insulating layer 103 away from the base substrate 101.

For example, in some examples, as illustrated in FIG. 8, the touch array substrate further includes a second insulating layer 104, disposed on a side of the first electrode 120 away from the base substrate 101.

Figure 9:
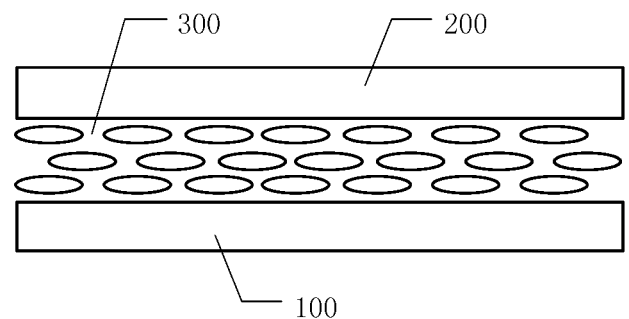
FIG. 9 is a structural view of a touch display panel provided by an embodiment of the present disclosure.

An embodiment of the present disclosure further provides a display panel. FIG. 9 is a structural view of a touch display panel provided by an embodiment of the present disclosure. The display panel includes the touch array substrate according to any embodiment as mentioned above. Therefore, the display panel has the beneficial effects corresponding to the beneficial effects of the touch array substrate included in the display panel, and details are not described herein again. In addition, other structures or components in the display panel, can be referred to a common design, which is not described herein again.

For example, in some examples, as illustrated in FIG. 9, the display panel further includes an opposing substrate 200 cell-assembled with the touch array substrate 100 and a liquid crystal layer 300 disposed between the touch array substrate 100 and the opposing substrate 200. The display panel can be a liquid crystal display panel. Certainly, the present disclosure includes but is not limited thereto, the display panel can also be other types of display panels.

An embodiment of the present disclosure further provides a display device. The display device includes the display panel according to any embodiment as mentioned above. Therefore, the display device has the beneficial effects corresponding to the beneficial effects of the display panel included in the display device, and details are not described herein again. In addition, other structures or components in the display device can be referred to a common design, which is not described herein again.

For example, in some examples, the display device can be any product or component with display function such as a smart phone, a tablet computer, a wearable electronic device, a television, a display, a notebook computer, a digital photo frame, a navigator, and the like.

The following points should to be noted:

(1) The accompanying drawings involve only the structure(s) in connection with the embodiment(s) of the present disclosure, and other structure(s) can be referred to common design(s).

(2) In the absence of conflict, the features of the same embodiment and the different embodiments ban be combined with each other.

The foregoing is only the embodiments of the present invention and not intended to limit the scope of protection of the present invention, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. A touch array substrate, comprising:
a plurality of first electrodes, disposed in a row direction and a column direction to form a plurality of electrode rows and a plurality of electrode columns; and
a plurality of sub pixels, disposed in the row direction and the column direction to form a plurality of pixel rows and a plurality of pixel columns;
wherein an edge of the plurality of first electrodes in the column direction comprises a convex shape and a concave shape, the convex shape of an edge of one of two adjacent ones of the plurality of electrode columns extends into the concave shape of an edge of the other of the two adjacent ones of the plurality of electrode columns,
the plurality of sub pixels comprise a plurality of gap sub pixels, each of the plurality of gap sub pixels is partially overlapped with each of the two adjacent ones of the plurality of electrode columns, and the gap sub pixels corresponding to the two adjacent ones of the plurality of electrode columns are located in different pixel columns.

2. The touch array substrate according to claim 1, wherein each of the plurality of first electrodes is overlapped with multiple gap sub pixels.

3. The touch array substrate according to claim 1, wherein two edges opposite to each other and respectively located at two adjacent ones of the plurality of first electrodes in the row direction are overlapped with gap sub pixels belonging to a same pixel column.

4. The touch array substrate according to claim 1, wherein each of the plurality of first electrodes has a shape of a rectangle, the first electrodes in each of the plurality of electrode columns are dislocated in the row direction to form the convex shape and the concave shape.

5. The touch array substrate according to claim 1, wherein in two edges opposite to each other and respectively located at two adjacent ones of the plurality of first electrodes in the row direction, each of the two edges comprises:
at least one concave portion, concaved in the row direction; and
at least one convex portion, protruded in the row direction,
wherein the concave portion and the convex portion are alternately disposed, the concave portion and the convex portion of each of the two edges are respectively overlapped with the gap sub pixels belonging to different sub pixel columns.

6. The touch array substrate according to claim 5, wherein the convex portion comprises a shape of a rectangle.

7. The touch array substrate according to claim 1, further comprising:
   a plurality of wires, extending in the column direction and electrically connected with the plurality of first electrodes respectively,
   wherein each of the plurality of wires passes through effective display regions of the sub pixels disposed in the column direction, each wire passing through the effective display regions of the gap sub pixels disposed in the column direction comprises a plurality of first portions and a plurality of second portions, the plurality of first portions are located between two adjacent ones of the plurality of first electrodes in the row direction, and the plurality of second portions are partially overlapped with at least one of the plurality of first electrodes.

8. The touch array substrate according to claim 7, wherein the plurality of first portions and the plurality of second portions are alternately disposed.

9. The touch array substrate according to claim 7, wherein a length of each of the plurality of first portions is equal to a length of each of the plurality of first electrodes in the column direction.

10. The touch array substrate according to claim 1, wherein each of the plurality of first electrodes is used as a common electrode and a touch electrode.

11. The touch array substrate according to claim 7, wherein each of the plurality of wires is used as a common electrode line and a touch electrode line.

12. The touch array substrate according to claim 1, wherein each of the plurality of sub pixels comprises:
   a second electrode, configured to form an electric field with a corresponding one of the plurality of first electrodes.

13. The touch array substrate according to claim 7, wherein the plurality of wires and the plurality of first electrodes are respectively electrically connected through via holes.

14. The touch array substrate according to claim 1, wherein each of the plurality of first electrodes correspond to an integer number of sub pixels in the column direction.

15. A display panel, comprising the touch array substrate according to claim 1.

16. The display panel according to claim 15, further comprising:
   an opposing substrate, cell-assembled with the touch array substrate; and
   a liquid crystal layer, between the touch array substrate and the opposing substrate.

17. A display device, comprising a display panel according to claim 15.

* * * * *